(12) United States Patent
Shabestary et al.

(10) Patent No.: US 10,490,203 B2
(45) Date of Patent: Nov. 26, 2019

(54) ECHO CANCELLATION FOR KEYWORD SPOTTING

(71) Applicant: GOOGLE LLC, Mountain View, CA (US)

(72) Inventors: Turaj Zakizadeh Shabestary, San Francisco, CA (US); Willem Bastiaan Kleijn, Eastborne Wellington (NZ); Jan Skoglund, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/846,049

(22) Filed: Dec. 18, 2017

(65) Prior Publication Data

US 2018/0174598 A1 Jun. 21, 2018

Related U.S. Application Data

(60) Provisional application No. 62/436,396, filed on Dec. 19, 2016.

(51) Int. Cl.
*G10L 21/0232* (2013.01)
*G10L 15/08* (2006.01)
(Continued)

(52) U.S. Cl.
CPC .......... *G10L 21/0232* (2013.01); *G10L 15/08* (2013.01); *G10L 21/0208* (2013.01);
(Continued)

(58) Field of Classification Search
CPC ......... H04M 9/082; G10L 2021/02082; G10L 21/0232; G10L 21/0264; G10L 25/18;
(Continued)

(56) References Cited

U.S. PATENT DOCUMENTS

| | | | |
|---|---|---|---|
| 9,516,410 B1 | 12/2016 | Ayrapetian et al. | |
| 9,589,575 B1 * | 3/2017 | Ayrapetian | H04R 3/02 |
| 2015/0117656 A1 | 4/2015 | Abe et al. | |

OTHER PUBLICATIONS

International Search Report and Written Opinion for International Application No. PCT/US2017/067347, dated Mar. 6, 2018, 14 pages.

(Continued)

*Primary Examiner* — Kile O Blair
(74) *Attorney, Agent, or Firm* — Brake Hughes Bellermann LLP (57) ABSTRACT

Techniques of performing linear acoustic echo cancellation performing a phase correction operation on the estimate of the echo signal based on a clock drift between a capture of an input microphone signal and a playout of a loudspeaker signal. Along these lines, the existence of the clock drift, i.e., a small difference in the sampling rates of the input microphone signal and the loudspeaker signal, can cause processing circuitry in a device configured to perform LAEC operations to generate a filter based on the magnitudes of the short-term Fourier transforms (STFTs) of the input microphone signal and the loudspeaker signal. Such a filter is real-valued and results in a positive estimate of the acoustic echo signal included in the input microphone signal. The phase of this estimate may then be aligned with the phase of the input microphone signal.

20 Claims, 4 Drawing Sheets

(51) Int. Cl.
    *H04R 3/04*       (2006.01)
    *H04M 9/08*       (2006.01)
    *G10L 21/0208*    (2013.01)

(52) U.S. Cl.
    CPC .............. *H04M 9/082* (2013.01); *H04R 3/04* (2013.01); *G10L 2015/088* (2013.01); *G10L 2021/02082* (2013.01)

(58) Field of Classification Search
    CPC ... G10L 15/08; G10L 2015/088; H04B 3/232; H04R 3/04
    See application file for complete search history.

(56) References Cited

OTHER PUBLICATIONS

Stokes, Jack W., et al., "Acoustic Echo Cancellation With Arbitrary Playback Sampling Rate", Stokes et al.; "Acoustic Echo Cancellation With Arbitrary Playback Sampling Rate"; Microsoft Research; ICASSP 2004; pp. 153-156.

* cited by examiner

ECHO CANCELLATION FOR KEYWORD SPOTTING

CROSS-REFERENCE TO RELATED APPLICATION

This application is a Non-Provisional of, and claims priority to, U.S. Provisional Patent Application No. 62/436,396, filed on Dec. 19, 2016, entitled "ECHO CANCELLATION FOR KEYWORD SPOTTING", the disclosure of which is incorporated by reference herein in its entirety.

TECHNICAL FIELD

This description relates to acoustic echo cancellation for keyword spotting.

BACKGROUND

In some automatic speech recognition (ASR) systems, acoustic echo occurs when a loudspeaker and a microphone become coupled. An ASR system is configured to convert human speech into commands for smart devices via a microphone. In some scenarios, the speech provided to the microphone is mixed in with ambient sounds such as output from a nearby loudspeaker. Further, such ambient sound is not directly input into the microphone, but is distorted due to acoustic echo from, e.g., reflections off walls of a room containing the microphone and loudspeaker. Such ASR systems provide linear acoustic echo cancellation (LAEC) to reduce or eliminate acoustic echo. A conventional LAEC operation includes using an adaptive filter to estimate an echo signal in audio output from the loudspeaker and subtracting the estimate of the echo signal from an audio input into the microphone.

SUMMARY

In one general aspect, a method can include receiving, by controlling circuitry of a device configured to perform linear acoustic echo cancellation (LAEC), for example for keyword spotting, samples of an input microphone signal via a microphone of the device, the input microphone signal including a captured message signal and being sampled at a first sampling rate. The method can also include obtaining, by the controlling circuitry, samples of a loudspeaker signal from a loudspeaker in the vicinity of the microphone, the loudspeaker signal being sampled at a second sampling rate different from the first sampling rate. The method can further include generating, by the controlling circuitry, a first acoustic echo signal based on the input microphone signal and the loudspeaker signal. The method can further include performing, by the controlling circuitry, an adjustment operation on a phase of the acoustic echo signal to produce a second acoustic echo signal, the adjustment operation being based on a difference between the first sampling rate and the second sampling rate. The method can further include performing, by the controlling circuitry, a difference operation on the input microphone signal and the second acoustic echo signal to produce the captured message signal.

The details of one or more implementations are set forth in the accompanying drawings and the description below. Other features will be apparent from the description and drawings, and from the claims.

DETAILED DESCRIPTION

In the conventional LAEC operation, the estimate of the echo signal is sensitive to clock drifts between the loudspeaker and the microphone. For example, suppose that the loudspeaker plays at 48 kHz and the microphone samples at 48.1 kHz. In this case, the signal from the loudspeaker and the acoustic echo input into the microphone may be out of synch. Such a clock drift may cause a significant degradation in performance metrics such as the echo-return loss enhancement (ERLE) of the conventional LAEC operation provided by an ASR.

In accordance with the implementations described herein and in contrast with the above-described conventional LAEC operation, improved techniques of performing LAEC operations involve performing a phase correction operation on the estimate of the echo signal based on a clock drift between a capture of an input microphone signal and a playout of a loudspeaker signal. Along these lines, the existence of the clock drift, i.e., a small difference in the sampling rates of the input microphone signal and the loudspeaker signal, can cause processing circuitry in a device configured to perform LAEC operations to generate a filter based on the magnitudes of the short-term Fourier transforms (STFTs) of the input microphone signal and the loudspeaker signal. Such a filter is real-valued and results in a positive estimate of the acoustic echo signal included in the input microphone signal. The phase of this estimate may then be aligned with the phase of the input microphone signal. When this estimate is inverse-transformed into the time domain and subtracted from the input microphone signal, the result is an accurate estimate of the captured message signal.

Figure 1:
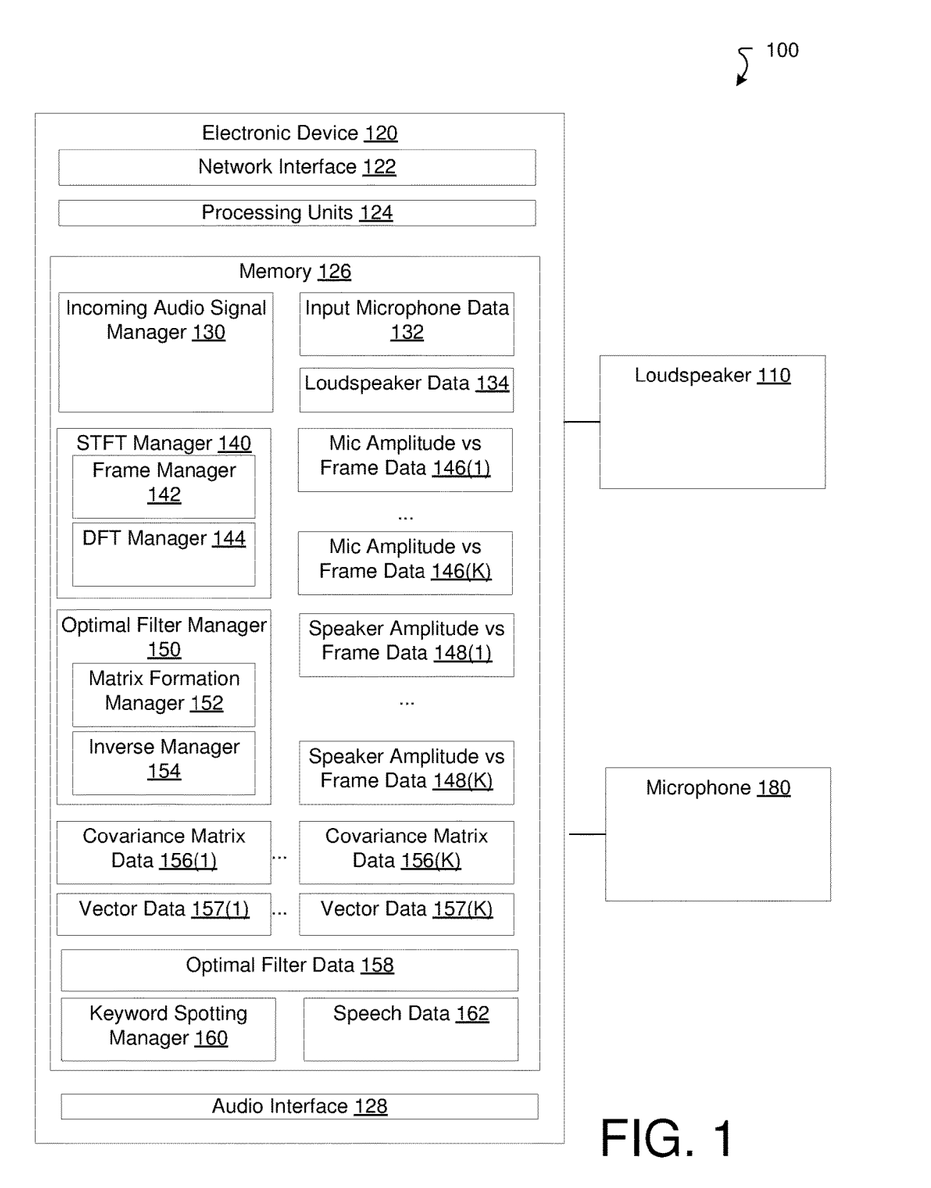
FIG. 1 is a diagram that illustrates an example electronic environment for implementing improved techniques described herein.

FIG. 1 is a diagram that illustrates an example electronic environment 100 in which the above-described improved techniques may be implemented. As shown, in FIG. 1, the example electronic environment 100 includes an electronic device 120 and a network 190. In some implementations, the electronic device 120 takes the form of a smartphone, a tablet computer, or the like.

The electronic device 120 is configured to provide acoustic echo cancellation. The electronic device 120 includes a loudspeaker 110, a network interface 122, one or more processing units 124, memory 126, an audio interface 128, and a microphone 180. The network interface 122 includes, for example, Ethernet adaptors, Token Ring adaptors, and the like, for converting electronic and/or optical signals received from the network 170 to electronic form for use by the point cloud compression computer 120. The set of processing units 124 include one or more processing chips and/or assemblies. The memory 126 includes both volatile memory (e.g., RAM) and non-volatile memory, such as one or more ROMs, disk drives, solid state drives, and the like. The set of processing units 124 and the memory 126 together form control circuitry, which is configured and arranged to carry out various methods and functions as described herein.

In some embodiments, one or more of the components of the electronic device 120 can be, or can include processors (e.g., processing units 124) configured to process instructions stored in the memory 126. Examples of such instructions as depicted in FIG. 1 include an incoming audio signal manager 130, a short-time Fourier transform (STFT) manager 140, an optimal filter manager 150, and a keyword spotting manager 160. Further, as illustrated in FIG. 1, the memory 126 is configured to store various data, which is described with respect to the respective managers that use such data.

The incoming audio signal manager 130 is configured to receive input microphone data 132 representing an input microphone signal that is the signal received at the microphone 180. The input microphone signal is sampled at a first sampling rate, e.g., 44 kHz, and the input microphone data 132 includes the samples, i.e., the amplitudes of the input microphone signal at the discrete times indicated by the first sampling rate. These amplitudes may be complex numbers.

The input microphone signal includes a captured message signal and an acoustic echo signal. In some implementations, the input microphone signal also includes a noise component. The captured message signal is to be estimated accurately enough for keyword spotting. The acoustic echo signal results from interactions of a loudspeaker signal emanating from the loudspeaker 110 with an ambient environment, e.g., a room.

The electronic device 120 may deduce the acoustic echo signal based on loudspeaker signal data 134. The loudspeaker data 134 represents a loudspeaker signal captured from the loudspeaker 110. The loudspeaker signal is sampled at a second sampling rate, e.g., 44.1 kHz, and the loudspeaker data 134 includes the samples, i.e., the amplitudes of the loudspeaker signal at the discrete times indicated by the second sampling rate. These amplitudes may be complex numbers.

The STFT manager 140 is configured to transform the input microphone data 132 and the loudspeaker data 134 from the time domain to a mixed time/frequency domain. Specifically, a STFT of a temporal signal involves dividing the signal into a specified number of temporal frames of a specified duration. Once the temporal signal has been divided into the frames, the STFT involves performing a Fourier transform operation on each of the framed signals. Along these lines, the frame manager 142 divides each of the input microphone data 132 and the loudspeaker data 134 into the specified number of frames, each frame having the specified duration in time. Accordingly, each frame includes a fixed number of samples of the input microphone data 132 or the loudspeaker data 134. For each frame, the DFT manager 144 performs a discrete Fourier transform (DFT) operation on the samples of that frame. The result of these operations are expressed in microphone amplitude vs frame data 146(1), . . . , 146(K), where K is the number of frequency samples per frame, and loudspeaker amplitude vs frame data 148(1), . . . , 148(K). Accordingly, data 146(1) represents a time evolution of the first frequency component of the microphone signal, data 148(1) represents a time evolution of the first frequency component of the loudspeaker signal, and so on.

The optimal filter manager 150 is configured to determine the acoustic echo signal based on the microphone amplitude vs frame data 146(1), . . . , 146(K) and the loudspeaker amplitude vs frame data 148(1), . . . , 148(K). Specifically, the optimal filter manager 150 assumes that the acoustic echo is linear and, in the frequency domain, the acoustic echo signal is proportional to the loudspeaker signal. The optimal filter manager 150 is configured to produce optimal filter data 158 that determines an estimate of the acoustic echo signal from the microphone amplitude vs frame data 146(1), . . . , 146(K) and the loudspeaker amplitude vs frame data 148(1), . . . , 148(K).

The optimal filter is determined by minimizing a least square difference between the input microphone signal and the acoustic echo signal. Specifically, the optimal filter for each frequency sample depends on a covariance matrix for that frequency sample having elements based on the loudspeaker amplitude vs frame data 148(1), . . . , 148(K) and a vector having elements based on the loudspeaker amplitude vs frame data 148(1), . . . , 148(K) and the microphone amplitude vs frame data 146(1), . . . , 146(K).

In some implementations, there is a phase lag between the input microphone data 132 and the loudspeaker data 134 due to clock drift, i.e., a difference in sampling rates. Along these lines, the matrix formation manager 152 is configured to generate the covariance matrix data 156(1), . . . , 156(K) based on absolute values of the loudspeaker amplitude vs frame data 148(1), . . . , 148(K) and the vector data 157(1), . . . , 157(K) based on absolute values of the loudspeaker amplitude vs frame data 148(1), . . . , 148(K) and the microphone amplitude vs frame data 146(1), . . . , 146(K). The inverse manager 154 is then configured to generate the inverse of each of the covariance matrix data 156(1), . . . , 156(K) and multiply this inverse by the corresponding vector data 157(1), . . . , 157(K) to produce the optimal filter 158. In this case, the elements of the optimal filter 158 are all real numbers.

The keyword spotting manager 160 is configured to produce speech data 162 based on the optimal filter data 158. Specifically, the keyword spotting manager 160 is configured to perform a multiplication of the optimal filter data 158 with each of the loudspeaker amplitude vs frame data 148(1), . . . , 148(K) to produce a magnitude of the acoustic echo signal. Also, the keyword spotting manager 160 is configured to adjust the phase of the acoustic echo signal. In some implementations, the keyword spotting manager 160 is configured to set the phase of the acoustic echo signal equal to the phase of the input microphone signal. Further, the keyword spotting manager 160 is configured to subtract the acoustic echo signal from the input microphone data 132 to produce the speech data 162.

In some implementations, the memory 126 can be any type of memory such as a random-access memory, a disk drive memory, flash memory, and/or so forth. In some implementations, the memory 126 can be implemented as more than one memory component (e.g., more than one RAM component or disk drive memory) associated with the components of the electronic device 120. In some implementations, the memory 126 can be a database memory. In some implementations, the memory 126 can be, or can include, a non-local memory. For example, the memory 126 can be, or can include, a memory shared by multiple devices (not shown). In some implementations, the memory 126 can be associated with a server device (not shown) within a network and configured to serve the components of the electronic device 120.

The components (e.g., modules, processing units 124) of the electronic device 120 can be configured to operate based on one or more platforms (e.g., one or more similar or different platforms) that can include one or more types of hardware, software, firmware, operating systems, runtime libraries, and/or so forth. In some implementations, the components of the electronic device 120 can be configured to operate within a cluster of devices (e.g., a server farm). In such an implementation, the functionality and processing of the components of the electronic device 120 can be distributed to several devices of the cluster of devices.

The components of the electronic device 120 can be, or can include, any type of hardware and/or software configured to process attributes. In some implementations, one or more portions of the components shown in the components of the electronic device 120 in FIG. 1 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the electronic device 120 can be, or can include, a software module configured for execution by at least one processor (not shown). In some implementations, the functionality of the components can be included in different modules and/or different components than those shown in FIG. 1.

Although not shown, in some implementations, the components of the electronic device 120 (or portions thereof) can be configured to operate within, for example, a data center (e.g., a cloud computing environment), a computer system, one or more server/host devices, and/or so forth. In some implementations, the components of the electronic device 120 (or portions thereof) can be configured to operate within a network. Thus, the components of the electronic device 120 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some embodiments, one or more of the components of the electronic device 120 can be, or can include, processors configured to process instructions stored in a memory. For example, the incoming audio signal manager 130 (and/or a portion thereof), the STFT manager 140 (and/or a portion thereof), the optimal filter manager 150 (and/or a portion thereof), and the keyword spotting manager 160 (and/or a portion thereof) can be a combination of a processor and a memory configured to execute instructions related to a process to implement one or more functions.

Figure 2:
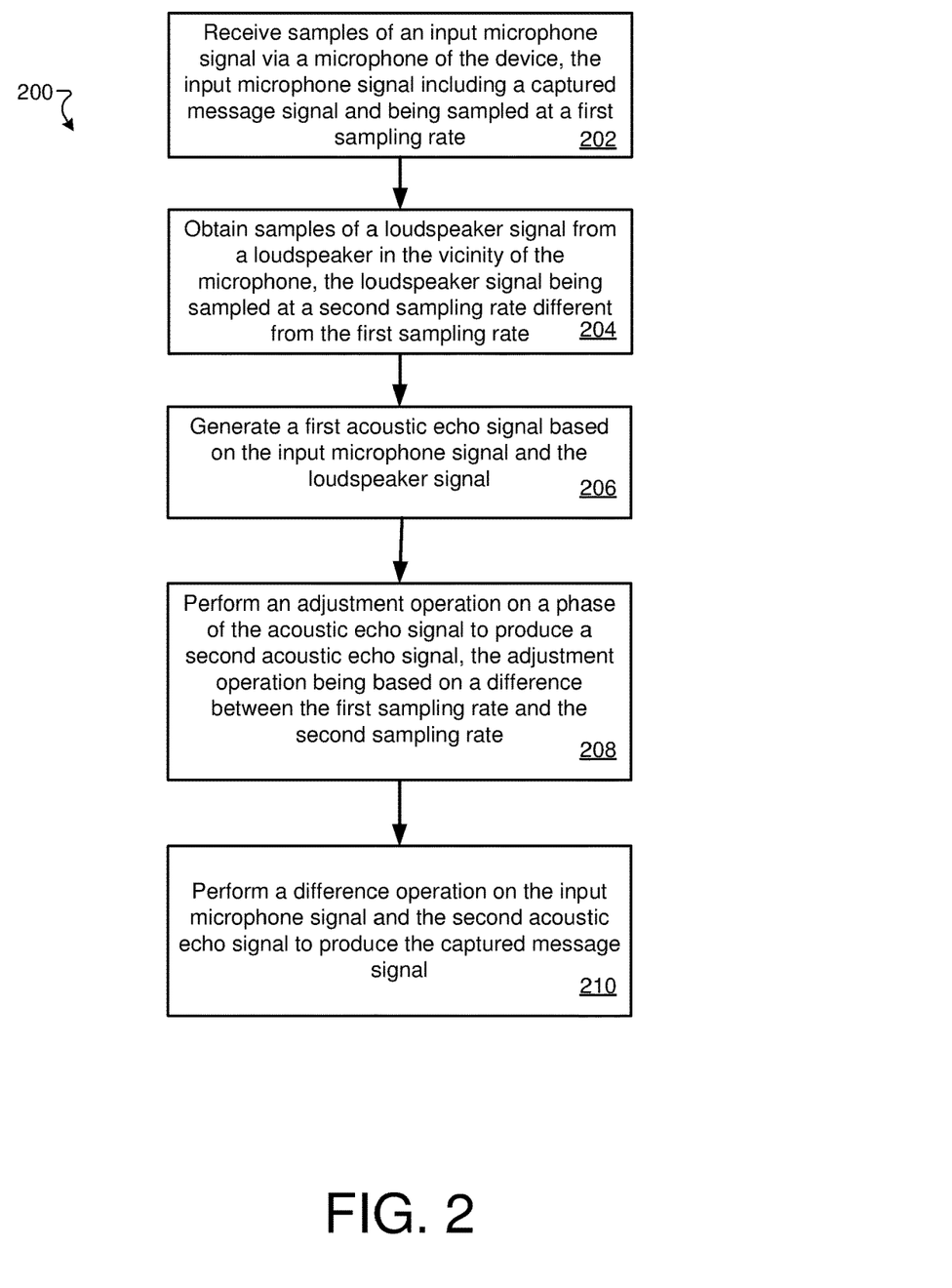
FIG. 2 is a flow chart that illustrates an example method of performing the improved techniques within the electronic environment shown in FIG. 1.

FIG. 2 is a flow chart that illustrates an example method 200 of performing color image processing. The method 200 may be performed by software constructs described in connection with FIG. 1, which reside in memory 126 of the point cloud compression computer 120 and are run by the set of processing units 124.

At 202, the electronic device 120 receives samples of an input microphone signal via a microphone of the device. The input microphone signal includes a captured message signal and is sampled at a first sampling rate.

At 204, the electronic device 120 obtains samples of a loudspeaker signal from a loudspeaker in the vicinity of the microphone. The loudspeaker signal is sampled at a second sampling rate different from the first sampling rate.

At 206, the electronic device 120 generates a first acoustic echo signal based on the input microphone signal and the loudspeaker signal.

At 208, the electronic device 120 performs an adjustment operation on a phase of the acoustic echo signal to produce a second acoustic echo signal. The adjustment operation is based on a difference between the first sampling rate and the second sampling rate.

At 210, the electronic device 120 performs a difference operation on the input microphone signal and the second acoustic echo signal to produce the captured message signal.

Figure 3:
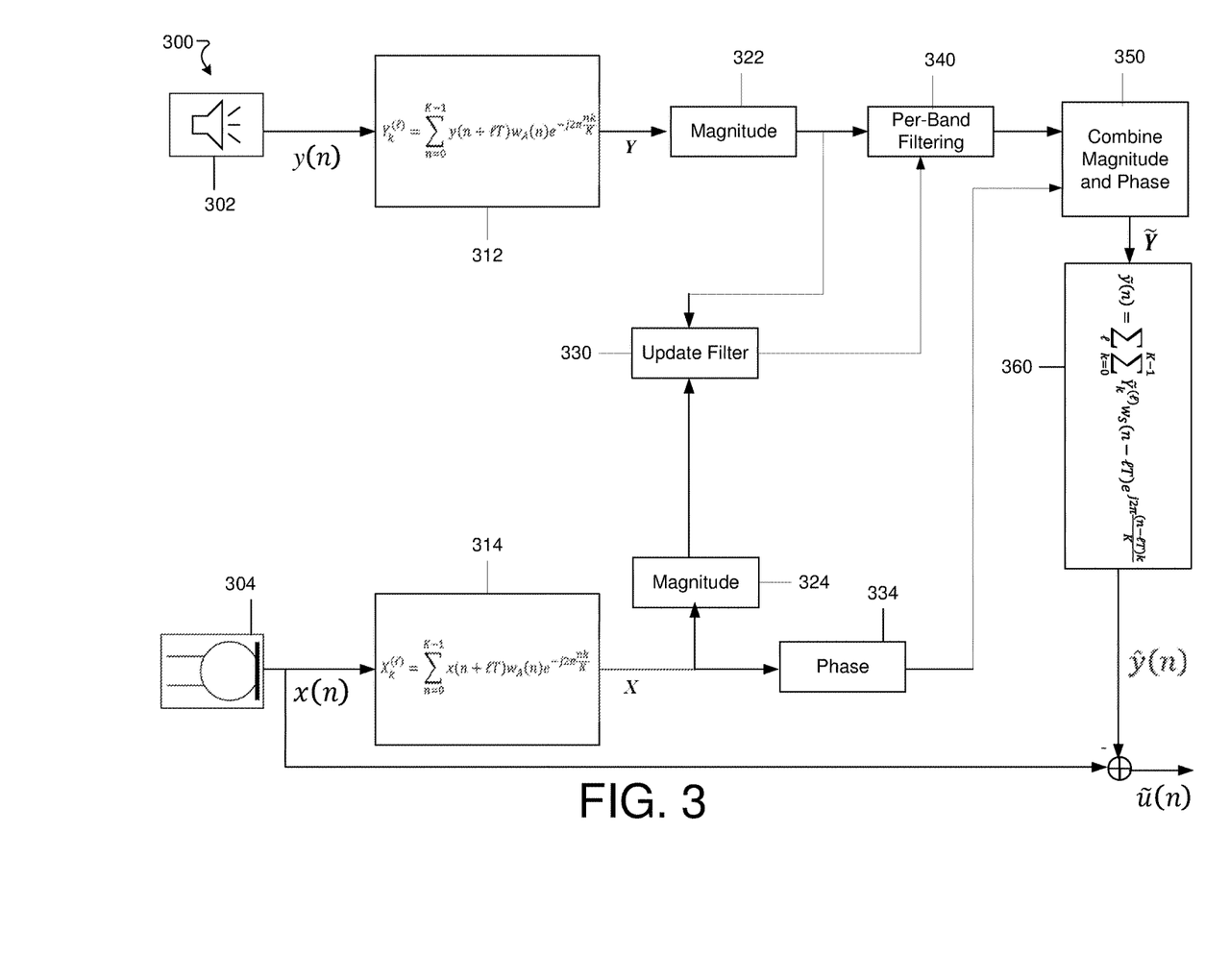
FIG. 3 is a schematic diagram that illustrates an example method of performing the improved techniques within the electronic environment shown in FIG. 1.

FIG. 3 is a schematic diagram illustrating an example audio system 300. As illustrated in this diagram, an input microphone signal x(n) is input into the audio system 300 at the microphone 304 at an instant of time. Further, a loudspeaker 302 plays a loudspeaker signal y(n). The input microphone signal x(n) includes the acoustic echo signal, the captured message signal, and a noise contribution.

As described above, the STFT manager 140, upon receipt of the input microphone signal x(n) over time, performs a STFT operation 314 on the input microphone signal x(n). Mathematically, the STFT takes the form $$X_k^{(l)} = \sum_{n=0}^{K-1} x(n + lT) w_A(n) e^{-j2\pi \frac{kn}{K}}, \quad \#(1)$$

where each frame has a temporal duration of T, $w_A$ is an analysis window, l is a frame index, and k is a frequency index. Examples of the analysis window $w_A$ include a top-hat, a Gaussian, a Hamming window, and the like. Similarly, the STFT 312 of the loudspeaker signal takes the form $$Y_k^{(l)} = \sum_{n=0}^{K-1} y(n + lT) w_A(n) e^{-j2\pi \frac{kn}{K}}. \quad \#(2)$$

The acoustic echo signal is expressed as an output of a linear system that operates on a loudspeaker signal input, i.e., $$\tilde{y}(n) = y(n) \star h(n), \# \quad (3)$$

where h(n) is the (unknown) impulse response of the linear system and ★ is the convolution operator. In the STFT domain, Eq. (3) takes the form $$\tilde{Y}_k^{(l)} = \sum_{n=0}^{K-1} \sum_{l'} Y_k^{(l')} H_{k,k'}^{(l-l')}, \quad \#(4)$$

and $$H_{k,k'}^{(l-l')} = [h(n) * \phi_{k,k'}(n)]_{n=(l-l')T}, \quad \#(5)$$

where $$\phi_{k,k'}(n) = e^{j2\pi \frac{k'n}{K}} \sum_{m=0}^{K-1} w_A(m) w_S(n+m) e^{-j2\pi \frac{(k-k')m}{K}}, \quad \#(6)$$

and $w_S$ is a synthesis window used in reconstructing a temporal signal from its STFT. Note that, for perfect reconstruction of the temporal signal, the synthesis window $w_S$ may be (nonuniquely) determined from the analysis window $w_A$ using the relation $$\sum_l w_A(n+lT)w_S(n+lT) = 1 \forall n. \quad \#(7)$$

Eq. (4) defines contributions from band-to-band filters (where k=k') and cross-band filters (where k ≠ k'). The number of cross-band filters needed for accurate reproduction of the captured message signal u(n)=x(n)−ỹ(n) (e.g., measured by the echo-return loss enhancement) decreases with increasing STFT frame size T and decreasing length of the loudspeaker signal K used for estimation. In keyword spotting applications, longer frame sizes are acceptable and fast adaptation to changes in the echo path is important. Hence, the frame size may be defined such that no cross-band filters are needed for the accurate reproduction of the captured message signal u(n). In this case, Eq. (4) takes the form $$\tilde{Y}_k^{(l)} = \sum_{l'} Y_k^{(l')} H_{k,k}^{(l-l')}, \quad \#(8)$$

i.e., a convolution over the frames.

The optimal filter manager 150, at 330, performs a filter update operation by finding the optimal filter $A_k$ that minimizes a mean-square error between the microphone signal and the acoustic echo signal. Nevertheless, such a solution for the optimal filter has been found to be very sensitive to clock drift. To find an estimate of the acoustic echo signal ỹ(n) with STFT $\tilde{Y}_k^{(l)}$ when there is a significant clock drift, the optimal filter manager 150 takes magnitudes 322, 324 of each of the loudspeaker STFT terms $Y_k^{(l)}$ and the input microphone STFT $X_k^{(l)}$. For the band-to-band filter, this optimal filter is found by solving the following equation:

$$\mathbb{R}_k A_k = r_k, \quad \#(9)$$

where $$\mathbb{R}_k(i,j) = E\{|Y_k^{(l-i)}||Y_k^{(l-j)}|\}, i, j = 0, \ldots, P-1, \quad \#(10)$$

$$r_k(i) = E\{|Y_k^{(l-i)}||X_k^{(l)}|\}, i = 0, \ldots, P-1 \quad \#(11)$$

$$A_k = [a_k^{(0)} \ldots a_k^{(P-1)}]^T, \quad \#(12)$$

where E{ } denotes expected value and P is the number of frames and $A_k$ represents the band-to-band filter over the frames. In some implementations, the expected values may be estimated by time domain averaging, e.g., exponentially weighted averaging. The matrix $\mathbb{R}_k$ is a Toeplitz matrix whose inverse is computed relatively quickly. The optimal filter manager 150, at 340, performs at 340 (per-band filtering) of the STFT of the acoustic echo signal as follows $$|\tilde{Y}_k^{(l)}| = \max\left(0, \sum_{p=0}^{P-1} a_k^{(p)} |Y_k^{(l-p)}|\right), \quad \#(13)$$

$$\arg(\tilde{Y}_k^{(l)}) = \arg(X_k^{(l)}), \quad \#(14)$$

where arg denotes the phase of a complex number. That is, the phase of the STFT of the acoustic echo signal estimate is set equal to the phase of the STFT of the input microphone signal. At 350, the optimal filter manager 150 combines the above magnitude and phase to produce the complex STFT of the acoustic echo signal estimate $\tilde{Y}_k^{(l)}$.

The keyword spotting manager 160, at 360, constructs the time-domain acoustic echo signal via an inverse STFT as follows:

$$\tilde{y}(n) = \sum_l \sum_{k=0}^{K-1} \tilde{Y}_k^{(l)} w_S(n-lT) e^{j2\pi \frac{(n-lT)k}{K}}, \quad \#(15)$$

and subtracts this acoustic echo signal from the input microphone signal x(n) to estimate the captured speech signal u(n)=x(n)−ỹ(n). The captured speech signal u(n) is an estimation because it is assumed that there is a noise component in the input microphone signal x(n), and the noise component is treated using the expected value estimates in Eqs. (10) and (11).

Another implementation of the disclosure includes techniques of performing linear acoustic echo cancellation performing a phase correction operation on the estimate of the echo signal based on a clock drift between a capture of an input microphone signal and a playout of a loudspeaker signal. Along these lines, the existence of the clock drift, i.e., a small difference in the sampling rates of the input microphone signal and the loudspeaker signal, can cause processing circuitry in a device configured to perform LAEC operations to generate a filter based on the magnitudes of the short-term Fourier transforms (STFTs) of the input microphone signal and the loudspeaker signal. Such a filter is real-valued and results in a positive estimate of the acoustic echo signal included in the input microphone signal. The phase of this estimate may then be aligned with the phase of the input microphone signal.

In some embodiments a computer program product comprising a nontransitive storage medium stores instructions and includes code which, when executed, cause a processing circuitry of a server computing device to perform operations comprising a method according to any embodiment or aspect described herein.

In some embodiments an electronic apparatus comprises: a memory; and a processing device operatively coupled with the memory to perform operations comprising a method according to any embodiment or aspect described herein.

Figure 4:
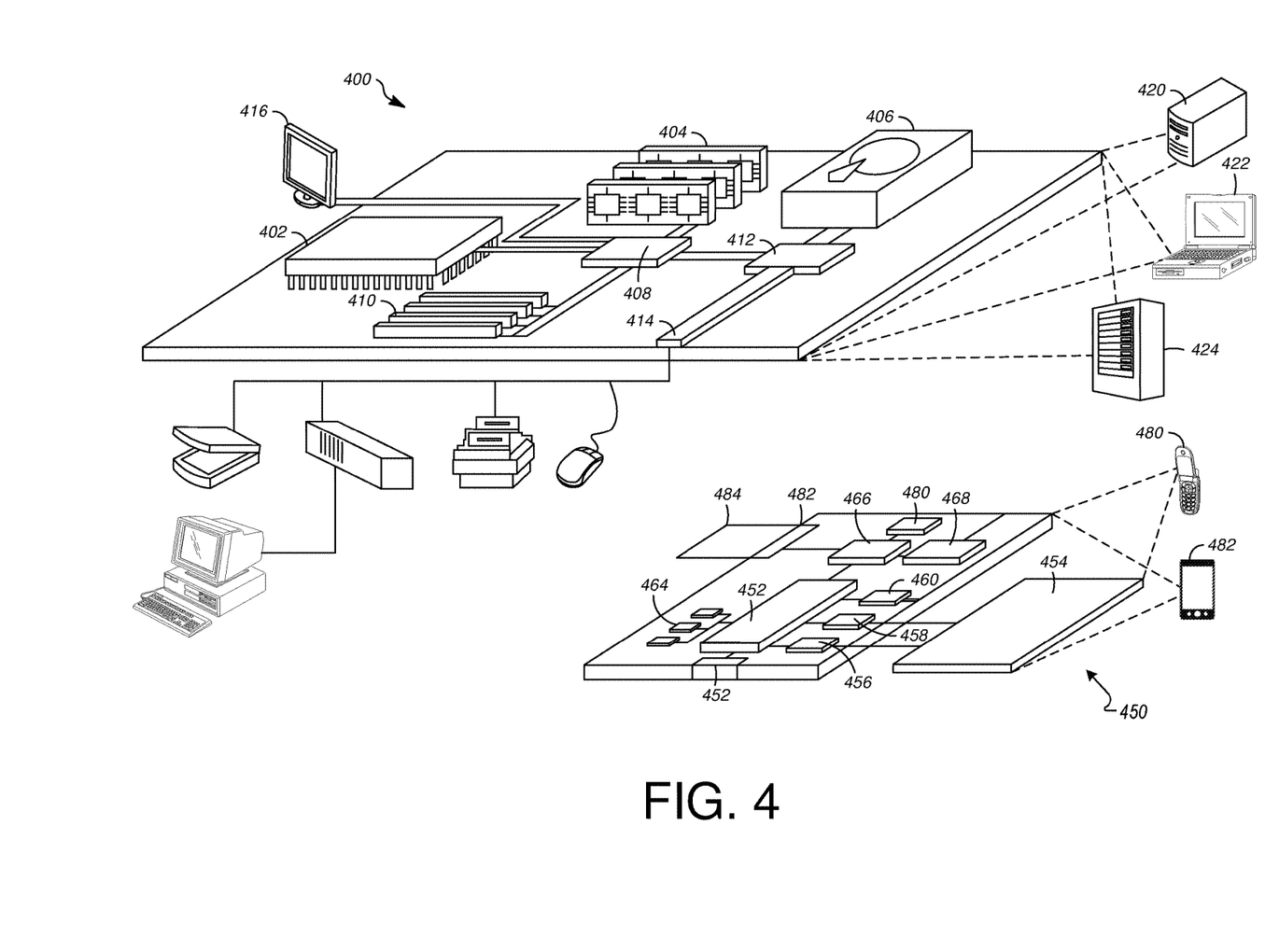
FIG. 4 illustrates an example of a computer device and a mobile computer device that can be used with circuits described here.

FIG. 4 illustrates an example of a generic computer device 400 and a generic mobile computer device 450, which may be used with the techniques described here.

As shown in FIG. 4, computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT LCD (Thin-Film-Transistor Liquid Crystal Display) or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provided as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452, that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smart phone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the specification.

It will also be understood that when an element is referred to as being on, connected to, electrically connected to, coupled to, or electrically coupled to another element, it may be directly on, connected or coupled to the other element, or one or more intervening elements may be present. In contrast, when an element is referred to as being directly on, directly connected to or directly coupled to another element, there are no intervening elements present. Although the terms directly on, directly connected to, or directly coupled to may not be used throughout the detailed description, elements that are shown as being directly on, directly connected or directly coupled can be referred to as such. The claims of the application may be amended to recite exemplary relationships described in the specification or shown in the figures.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A method, comprising:
   receiving, by controlling circuitry of a device configured to perform linear acoustic echo cancellation (LAEC) for keyword spotting, samples of an input microphone signal via a microphone of the device, the input microphone signal including a captured message signal and being sampled at a first sampling rate;
   obtaining, by the controlling circuitry, samples of a loudspeaker signal from a loudspeaker in the vicinity of the microphone, the loudspeaker signal being sampled at a second sampling rate different from the first sampling rate;

generating, by the controlling circuitry, a first acoustic echo signal based on the input microphone signal and the loudspeaker signal;

performing, by the controlling circuitry, an adjustment operation on a phase of the acoustic echo signal to produce a second acoustic echo signal, the adjustment operation being based on a difference between the first sampling rate and the second sampling rate; and performing, by the controlling circuitry, a difference operation on the input microphone signal and the second acoustic echo signal to produce the captured message signal.

2. The method as in claim 1, wherein generating the first acoustic echo signal based on the input microphone signal and the loudspeaker signal includes:

generating, as the first acoustic echo signal, a magnitude of an acoustic echo signal based on a magnitude of the input microphone signal and a magnitude of the loudspeaker signal.

3. The method as in claim 2, further comprising:

in response to receiving the input microphone signal, dividing the input microphone signal into a plurality of frames, each of the plurality of frames of the input microphone signal spanning a specified length of time;

performing a Fourier transform (FT) operation on each of the plurality of frames of the input microphone signal to produce a short-time Fourier transform (STFT) of the input microphone signal, the STFT of the input microphone signal including a respective amplitude corresponding to each of a set of frequency bands and to each of the plurality of frames of the input microphone signal;

in response to receiving the loudspeaker signal, dividing the loudspeaker signal into a plurality of frames, each of the plurality of frames of the loudspeaker signal spanning the specified length of time; and performing a FT operation on each of the plurality of frames of the loudspeaker signal to produce a short-time Fourier transform (STFT) of the loudspeaker signal, the STFT of the loudspeaker signal including a respective amplitude corresponding to each of the set of frequency bands and to each of the plurality of frames of the input microphone signal, wherein generating the magnitude of the acoustic echo signal based on the magnitude of the input microphone signal and the magnitude of the loudspeaker signal includes:

for a frequency band of the set of frequency bands and for each of the plurality of frames, generating (i) an absolute value of the amplitude of the input microphone signal corresponding to the frequency band and to that frame and (ii) an absolute value of the amplitude of the loudspeaker signal corresponding to the frequency band and to that frame.

4. The method as in claim 3, wherein generating the magnitude of the acoustic echo signal based on the magnitude of the input microphone signal and the magnitude of the loudspeaker signal further includes, for each of the set of frequency bands and for each of the plurality of frames:

generating (i) a covariance matrix for that frequency band and that frame, the covariance matrix having a plurality of elements, each of the plurality of elements of the covariance matrix being a product of the absolute value of the loudspeaker signal corresponding to that frequency band and to a first frame and the absolute value of the loudspeaker signal corresponding to that frequency band and to a second frame and (ii) a first vector for that frequency band, the first vector having a plurality of elements, each of the plurality of elements of the being a product of the absolute value of the loudspeaker signal corresponding to that frequency band and to the first frame and the absolute value of the input microphone signal corresponding to that frequency band and to that frame;

forming a product of an inverse of the covariance matrix for that frequency band and the first vector for that frequency to produce a band-to-band filter for that frequency band, the band-to-band filter having elements, each of the elements of the band-to-band filter corresponding to a respective frame of the plurality of frames; and forming, as the magnitude of the acoustic echo signal, an inner product of the band-to-band filter for that frequency band and a second vector, the second vector having a plurality of elements, each of the plurality of elements being an absolute value of the loudspeaker signal for that frequency band corresponding to a respective frame of the plurality of frames.

5. The method as in claim 4, wherein generating the magnitude of the acoustic echo signal based on the magnitude of the input microphone signal and the magnitude of the loudspeaker signal further includes, for each of the set of frequency bands:

in response to the inner product of the band-to-band filter for that frequency band and the second vector being less than zero, setting the magnitude of the acoustic echo signal for that frequency band to zero.

6. The method as in claim 4, further comprising:

receiving new samples of the input microphone signal and the loudspeaker signal;

dividing each of the input microphone signal and the loudspeaker signal into a plurality of new frames;

forming an error between the magnitude of the STFT of the input microphone signal and an inner product of the band-to-band filter and the magnitude of the STFT of the loudspeaker signal over the plurality of frames; and updating the band-to-band filter in response to the error being greater than a threshold.

7. The method as in claim 3, wherein performing the adjustment operation on the phase of the acoustic echo signal includes:

producing, as the phase of the acoustic echo signal, a phase of the input microphone signal.

8. A computer program product comprising a nontransitive storage medium, the computer program product including code that, when executed by processing circuitry of a server computing device configured to perform linear acoustic echo cancellation (LAEC) for keyword spotting, causes the processing circuitry to perform a method, the method comprising:

receiving samples of an input microphone signal via a microphone of the device, the input microphone signal including a captured message signal and being sampled at a first sampling rate;

obtaining samples of a loudspeaker signal from a loudspeaker in the vicinity of the microphone, the loudspeaker signal being sampled at a second sampling rate different from the first sampling rate;

generating a first acoustic echo signal based on the input microphone signal and the loudspeaker signal;

performing an adjustment operation on a phase of the acoustic echo signal to produce a second acoustic echo signal, the adjustment operation being based on a difference between the first sampling rate and the second sampling rate; and performing a difference operation on the input microphone signal and the second acoustic echo signal to produce the captured message signal.

9. The computer program product as in claim 8, wherein generating the first acoustic echo signal based on the input microphone signal and the loudspeaker signal includes:

generating, as the first acoustic echo signal, a magnitude of an acoustic echo signal based on a magnitude of the input microphone signal and a magnitude of the loudspeaker signal.

10. The computer program product as in claim 9, wherein the method further comprises:

in response to receiving the input microphone signal, dividing the input microphone signal into a plurality of frames, each of the plurality of frames of the input microphone signal spanning a specified length of time;

performing a Fourier transform (FT) operation on each of the plurality of frames of the input microphone signal to produce a short-time Fourier transform (STFT) of the input microphone signal, the STFT of the input microphone signal including a respective amplitude corresponding to each of a set of frequency bands and to each of the plurality of frames of the input microphone signal;

in response to receiving the loudspeaker signal, dividing the loudspeaker signal into a plurality of frames, each of the plurality of frames of the loudspeaker signal spanning the specified length of time; and performing a FT operation on each of the plurality of frames of the loudspeaker signal to produce a short-time Fourier transform (STFT) of the loudspeaker signal, the STFT of the loudspeaker signal including a respective amplitude corresponding to each of the set of frequency bands and to each of the plurality of frames of the input microphone signal, wherein generating the magnitude of the acoustic echo signal based on the magnitude of the input microphone signal and the magnitude of the loudspeaker signal includes:

for a frequency band of the set of frequency bands and for each of the plurality of frames, generating (i) an absolute value of the amplitude of the input microphone signal corresponding to the frequency band and to that frame and (ii) an absolute value of the amplitude of the loudspeaker signal corresponding to the frequency band and to that frame.

11. The computer program product as in claim 10, wherein generating the magnitude of the acoustic echo signal based on the magnitude of the input microphone signal and the magnitude of the loudspeaker signal further includes, for each of the set of frequency bands and for each of the plurality of frames:

generating (i) a covariance matrix for that frequency band and that frame, the covariance matrix having a plurality of elements, each of the plurality of elements of the covariance matrix being a product of the absolute value of the loudspeaker signal corresponding to that frequency band and to a first frame and the absolute value of the loudspeaker signal corresponding to that frequency band and to a second frame and (ii) a first vector for that frequency band, the first vector having a plurality of elements, each of the plurality of elements of the being a product of the absolute value of the loudspeaker signal corresponding to that frequency band and to the first frame and the absolute value of the input microphone signal corresponding to that frequency band and to that frame;

forming a product of an inverse of the covariance matrix for that frequency band and the first vector for that frequency to produce a band-to-band filter for that frequency band, the band-to-band filter having elements, each of the elements of the band-to-band filter corresponding to a respective frame of the plurality of frames; and forming, as the magnitude of the acoustic echo signal, an inner product of the band-to-band filter for that frequency band and a second vector, the second vector having a plurality of elements, each of the plurality of elements being an absolute value of the loudspeaker signal for that frequency band corresponding to a respective frame of the plurality of frames.

12. The computer program product as in claim 11, wherein generating the magnitude of the acoustic echo signal based on the magnitude of the input microphone signal and the magnitude of the loudspeaker signal further includes, for each of the set of frequency bands:

in response to the inner product of the band-to-band filter for that frequency band and the second vector being less than zero, setting the magnitude of the acoustic echo signal for that frequency band to zero.

13. The computer program product as in claim 11, wherein the method further comprises:

receiving new samples of the input microphone signal and the loudspeaker signal;

dividing each of the input microphone signal and the loudspeaker signal into a plurality of new frames;

forming an error between the magnitude of the STFT of the input microphone signal and an inner product of the band-to-band filter and the magnitude of the STFT of the loudspeaker signal over the plurality of frames; and updating the band-to-band filter in response to the error being greater than a threshold.

14. The computer program product as in claim 10, wherein performing the adjustment operation on the phase of the acoustic echo signal includes:

producing, as the phase of the acoustic echo signal, a phase of the input microphone signal.

15. An electronic apparatus configured to, the electronic apparatus comprising:

memory; and controlling circuitry coupled to the memory, the controlling circuitry being configured to perform linear acoustic echo cancellation (LAEC) for keyword spotting:

receive samples of an input microphone signal via a microphone of the device, the input microphone signal including a captured message signal and being sampled at a first sampling rate;

obtain samples of a loudspeaker signal from a loudspeaker in the vicinity of the microphone, the loudspeaker signal being sampled at a second sampling rate different from the first sampling rate;

generate a first acoustic echo signal based on the input microphone signal and the loudspeaker signal;

perform an adjustment operation on a phase of the acoustic echo signal to produce a second acoustic echo signal, the adjustment operation being based on a difference between the first sampling rate and the second sampling rate; and perform a difference operation on the input microphone signal and the second acoustic echo signal to produce the captured message signal.

16. The electronic apparatus as in claim 15, wherein the controlling circuitry configured to generate the first acoustic echo signal based on the input microphone signal and the loudspeaker signal is further configured to:
generate, as the first acoustic echo signal, a magnitude of an acoustic echo signal based on a magnitude of the input microphone signal and a magnitude of the loudspeaker signal.

17. The electronic apparatus as in claim 16, wherein the controlling circuitry is further configured to:
in response to receiving the input microphone signal, divide the input microphone signal into a plurality of frames, each of the plurality of frames of the input microphone signal spanning a specified length of time;
perform a Fourier transform (FT) operation on each of the plurality of frames of the input microphone signal to produce a short-time Fourier transform (STFT) of the input microphone signal, the STFT of the input microphone signal including a respective amplitude corresponding to each of a set of frequency bands and to each of the plurality of frames of the input microphone signal;
in response to receiving the loudspeaker signal, divide the loudspeaker signal into a plurality of frames, each of the plurality of frames of the loudspeaker signal spanning the specified length of time; and
perform a FT operation on each of the plurality of frames of the loudspeaker signal to produce a short-time Fourier transform (STFT) of the loudspeaker signal, the STFT of the loudspeaker signal including a respective amplitude corresponding to each of the set of frequency bands and to each of the plurality of frames of the input microphone signal,
wherein the controlling circuitry configured to generate the magnitude of the acoustic echo signal based on the magnitude of the input microphone signal and the magnitude of the loudspeaker signal is further configured to:
for a frequency band of the set of frequency bands and for each of the plurality of frames, generate (i) an absolute value of the amplitude of the input microphone signal corresponding to the frequency band and to that frame and (ii) an absolute value of the amplitude of the loudspeaker signal corresponding to the frequency band and to that frame.

18. The electronic apparatus as in claim 17, wherein the controlling circuitry configured to generate the magnitude of the acoustic echo signal based on the magnitude of the input microphone signal and the magnitude of the loudspeaker signal further is further configured to, for each of the set of frequency bands and for each of the plurality of frames:
generate (i) a covariance matrix for that frequency band and that frame, the covariance matrix having a plurality of elements, each of the plurality of elements of the covariance matrix being a product of the absolute value of the loudspeaker signal corresponding to that frequency band and to a first frame and the absolute value of the loudspeaker signal corresponding to that frequency band and to a second frame and (ii) a first vector for that frequency band, the first vector having a plurality of elements, each of the plurality of elements of the being a product of the absolute value of the loudspeaker signal corresponding to that frequency band and to the first frame and the absolute value of the input microphone signal corresponding to that frequency band and to that frame;
form a product of an inverse of the covariance matrix for that frequency band and the first vector for that frequency to produce a band-to-band filter for that frequency band, the band-to-band filter having elements, each of the elements of the band-to-band filter corresponding to a respective frame of the plurality of frames; and
form, as the magnitude of the acoustic echo signal, an inner product of the band-to-band filter for that frequency band and a second vector, the second vector having a plurality of elements, each of the plurality of elements being an absolute value of the loudspeaker signal for that frequency band corresponding to a respective frame of the plurality of frames.

19. The electronic apparatus as in claim 18, wherein the controlling circuitry configured to generate the magnitude of the acoustic echo signal based on the magnitude of the input microphone signal and the magnitude of the loudspeaker signal is further configured to, for each of the set of frequency bands:
in response to the inner product of the band-to-band filter for that frequency band and the second vector being less than zero, set the magnitude of the acoustic echo signal for that frequency band to zero.

20. The electronic apparatus as in claim 17, wherein the controlling circuitry configured to perform the adjustment operation on the phase of the acoustic echo signal is further configured to:
produce, as the phase of the acoustic echo signal, a phase of the input microphone signal.

* * * * *

UNITED STATES PATENT AND TRADEMARK OFFICE
CERTIFICATE OF CORRECTION

PATENT NO. : 10,490,203 B2
APPLICATION NO. : 15/846049
DATED : November 26, 2019
INVENTOR(S) : Shabestary et al.

Page 1 of 1

It is certified that error appears in the above-identified patent and that said Letters Patent is hereby corrected as shown below:

In the Claims

In Column 18, Claim 18, Line 3, delete "further is further" and insert --is further--, therefor.

Signed and Sealed this
Eighteenth Day of May, 2021

Drew Hirshfeld
*Performing the Functions and Duties of the
Under Secretary of Commerce for Intellectual Property and
Director of the United States Patent and Trademark Office*